United States Patent
Mohandoss

(10) Patent No.: US 10,037,239 B2
(45) Date of Patent: Jul. 31, 2018

(54) SYSTEM AND METHOD FOR CLASSIFYING DEFECTS OCCURRING IN A SOFTWARE ENVIRONMENT

(71) Applicant: Wipro Limited, Bangalore (IN)

(72) Inventor: Sathya Keerthi Mohandoss, Bentonville, AR (US)

(73) Assignee: Wlpro Limited, Bangalore (IN)

( * ) Notice: Subject to any disclaimer, the term of this patent is extended or adjusted under 35 U.S.C. 154(b) by 102 days.

(21) Appl. No.: 15/082,833

(22) Filed: Mar. 28, 2016

(65) Prior Publication Data
US 2017/0277583 A1 Sep. 28, 2017

(51) Int. Cl.
*G06F 11/00* (2006.01)
*G06F 11/07* (2006.01)

(52) U.S. Cl.
CPC ........ *G06F 11/079* (2013.01); *G06F 11/0706* (2013.01); *G06F 11/0751* (2013.01)

(58) Field of Classification Search
CPC . G06F 11/079; G06F 11/0706; G06F 11/0751
See application file for complete search history.

(56) References Cited

U.S. PATENT DOCUMENTS

| | | | |
|---|---|---|---|
| 6,757,837 B1 | 6/2004 | Platt et al. | |
| 8,032,866 B1* | 10/2011 | Golender | G06F 11/366 717/128 |
| 9,189,317 B1 | 11/2015 | Marimuthu | |
| 9,268,674 B1* | 2/2016 | Ben-Cnaan | G06F 11/3688 |
| 9,336,259 B1* | 5/2016 | Kane | G06F 17/30592 |
| 2005/0120273 A1* | 6/2005 | Hudson | G06F 11/0748 714/38.11 |
| 2006/0085689 A1* | 4/2006 | Bjorsne | G06F 11/0748 714/39 |
| 2010/0306597 A1* | 12/2010 | Goldszmidt | G06F 11/0709 714/47.1 |
| 2010/0318846 A1* | 12/2010 | Sailer | G06F 11/0748 714/26 |
| 2011/0060946 A1* | 3/2011 | Gupta | G06F 11/0709 714/26 |
| 2011/0141913 A1* | 6/2011 | Clemens | H04L 41/0681 370/242 |
| 2011/0276836 A1* | 11/2011 | Kahana | G06F 11/0709 714/38.1 |

(Continued)

FOREIGN PATENT DOCUMENTS

EP 1187024 A2 3/2002

*Primary Examiner* — Philip Guyton
(74) *Attorney, Agent, or Firm* — LeClairRyan PLLC

(57) ABSTRACT

System and method for classifying defects occurring in a software environment are disclosed. In one embodiment, the method comprises receiving defect data from at least one data source. The defect data comprises the defects occurring in the software environment. The method further comprises receiving current data and historical data pertaining to the software environment from a current environment database and a historical environment database. The method further comprises analyzing the defect data based on the current data, the historical data, and one or more rules to determine at least one root cause causing the defects in the software environment. The method further comprises classifying each of the defects into one or more categories based on the at least one root cause.

18 Claims, 4 Drawing Sheets

(56) References Cited

U.S. PATENT DOCUMENTS

| | | | | |
|---|---|---|---|---|
| 2013/0198116 A1* | 8/2013 | Bhamidipaty | ...... | H04L 41/5074 706/12 |
| 2014/0129536 A1* | 5/2014 | Anand | ............... | G06Q 10/0635 707/706 |
| 2014/0372347 A1* | 12/2014 | Cohen | ................. | G06F 11/0709 706/12 |

* cited by examiner

SYSTEM AND METHOD FOR CLASSIFYING DEFECTS OCCURRING IN A SOFTWARE ENVIRONMENT

FIELD

This disclosure relates generally to defects/irregularities in a software environment and more particularly to a system and a method for classifying defects occurring in a software environment.

BACKGROUND

A software environment may be understood as set of facilities to support an application/software. The set of facilities may include operating system, windows management, database, etc., that are available to the application/software when it is being executed by a processor. It is often observed when the application/software are implemented into a real client's environment, also referred to as the software environment, the application may show unanticipated issues. There may be a multiple environmental issues that may not comply with the ideally suggested environmental supporting components and compliance regulations. Hence causing ambiguity in the possibility of errors. When the software is scanned for defects, there may be none in the communication or coding level of the application. Hence causing a huge need for root cause analyses to be assessed in wide range from software to environment and there compatibility factors.

Typically, in Quality Assurance (QA) industry, it becomes very ambiguous to classify a defect related to environment which leads to heavy investment on hardware's, Cost of Quality which has potential impact to customer revenue and leading to waste of money.

SUMMARY

In one embodiment, a method for classifying defects occurring in a software environment is disclosed. The method comprises receiving defect data from at least one data source. The defect data comprises the defects occurring in the software environment. The method further comprises receiving current data and historical data pertaining to the software environment from a current environment database and a historical environment database. The method further comprises analyzing the defect data based on the current data, the historical data, and one or more rules to determine at least one root cause causing the defects in the software environment. The method further comprises classifying each of the defects into one or more categories based on the at least one root cause.

In another embodiment, a system for classifying defects occurring in a software environment is disclosed. The system includes at least one processors and a computer-readable medium. The computer-readable medium stores instructions that, when executed by the at least one processor, cause the at least one processor to perform operations comprising receiving defect data from at least one data source. The defect data comprises the defects occurring in the software environment. The operations further comprise receiving current data and historical data pertaining to the software environment from a current environment database and a historical environment database. The operations further comprise analyzing the defect data based on the current data, the historical data, and one or more rules to determine at least one root cause causing the defects in the software environment. The operations further comprise classifying each of the defects into one or more categories based on the at least one root cause.

In another embodiment, a non-transitory computer-readable storage medium for classifying defects occurring in a software environment is disclosed, which when executed by a computing device, cause the computing device to perform operations comprising receiving defect data from at least one data source. The defect data comprises the defects occurring in the software environment. The operations further comprise receiving current data and historical data pertaining to the software environment from a current environment database and a historical environment database. The operations further comprise analyzing the defect data based on the current data, the historical data, and one or more rules to determine at least one root cause causing the defects in the software environment. The operations further comprise classifying each of the defects into one or more categories based on the at least one root cause.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The present subject matter discloses systems and methods for classifying defects occurring in a software environment. The systems and methods may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the systems and methods may be implemented in other computing systems, albeit with a few variations, as will be understood by a person skilled in the art.

Working of the systems and methods for classifying defects occurring in a software environment is described in conjunction with FIGS. 1-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
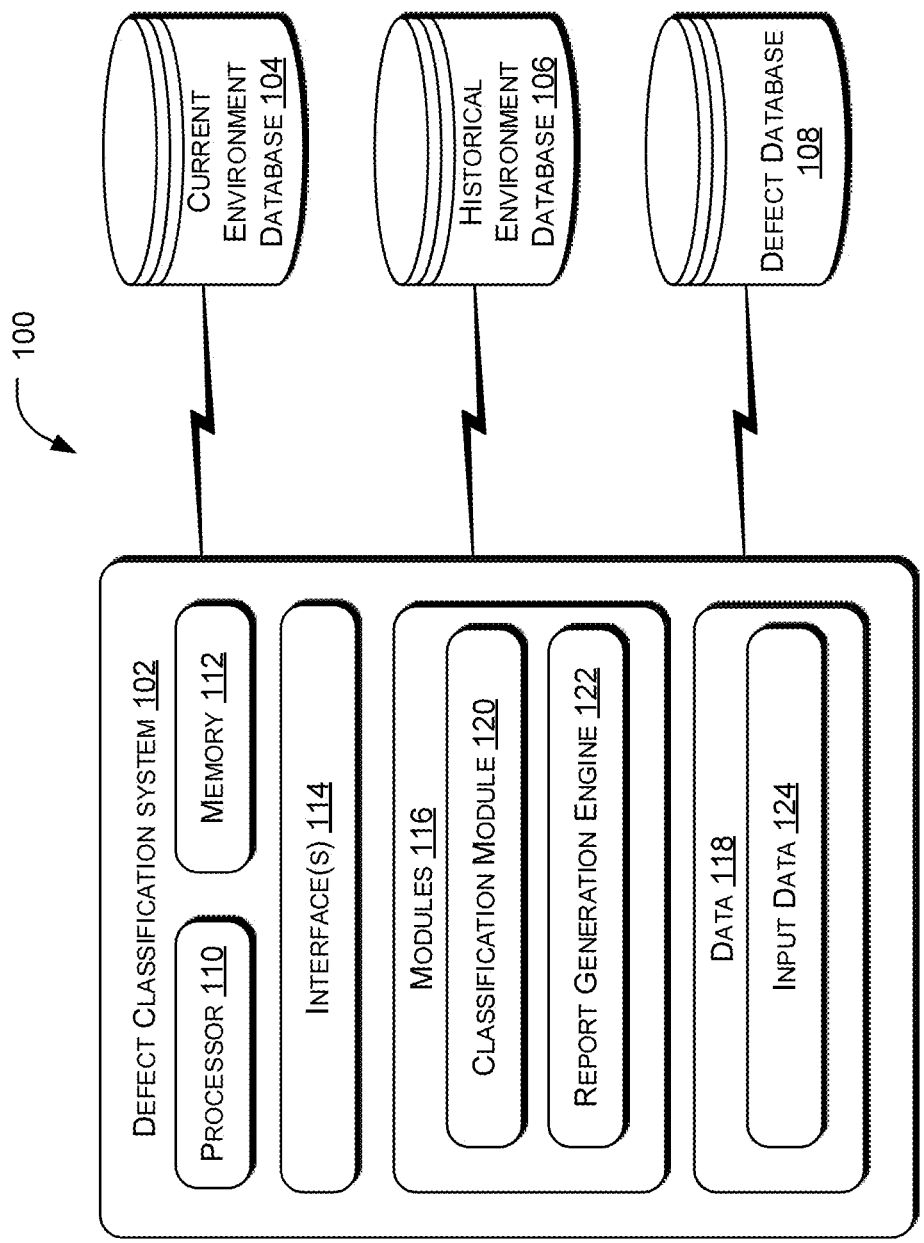
FIG. 1 illustrates an exemplary network implementation comprising defect classification system, in accordance with some embodiments of the present disclosure.

FIG. 1 illustrates an exemplary network environment 100 comprising a defect classification system 102, in accordance with some embodiments of the present disclosure. As shown in FIG. 1, the defect classification system 102 is communicatively coupled to a current environment database 104, a historical environment database 106, and a defect database 108. Although the defect database 108 is shown external to the defect classification system 102 in FIG. 1, it may be noted that, in one implementation, the defect database 108 may be present within the defect classification system 102. Hereinafter, the defect classification system 102 may be interchangeably referred to as system 102.

The system 102 may be implemented on variety of computing systems. Examples of the computing systems may include a laptop computer, a desktop computer, a tablet, a notebook, a workstation, a mainframe computer, a server, a network server, and the like.

In an example, the current environment database 104 may comprises compliance and the configurational settings of the software environment in real time. The current environment database 104 may comprises settings and attributes corresponding to various fields, such as license, hardware, remote access, configuration set up, browser, natural calamities, and server traffic. The settings and the attributes may help in identifying a current state of the software environment.

In an example, the historical environment database 106 may comprises logs of previous settings and attributes across all the fields. The previous settings and attributes may be then used by the system 102 to identify previous states of the software environment. The previous states may be used for determining defects/irregularities in the software environment.

In an example, the defect database 108 may act as a repository of defects/irregularities and comprise the defects along with root causes that cause the defects. In an example, the defects may be defined as issues that users are facing in the software environment. These issues could be related to any application not working properly or communication issue between applications also functional issues of applications.

The system 102 may be communicatively coupled to the current environment database 104, the historical database, and the defect database 108 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

As shown in FIG. 1, the system 102 comprises a processor 110, a memory 112 coupled to the processor 110, and interface(s) 114. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions stored in the memory 112. The memory 112 can include any non-transitory computer-readable medium known in the art including, for example, volatile memory (e.g., RAM), and/or non-volatile memory (e.g., EPROM, flash memory, etc.).

The interface(s) 114 may include a variety of software and hardware interfaces, for example, a web interface, a graphical user interface, etc., allowing the system 102 to interact with user devices. Further, the interface(s) 114 may enable the system 102 respectively to communicate with other computing devices. The interface(s) 114 can facilitate multiple communications within a wide variety of networks and protocol types, including wired networks, for example LAN, cable, etc., and wireless networks such as WLAN, cellular, or satellite. The interface(s) 114 may include one or more ports for connecting a number of devices to each other or to another server.

In one example, the system 102 includes modules 116 and data 118. In one embodiment, the modules 116 and the data 118 may be stored within the memory 112. In one example, the modules 116, amongst other things, include routines, programs, objects, components, and data structures, which perform particular tasks or implement particular abstract data types. The modules 116 and may also be implemented as, signal processor(s), state machine(s), logic circuitries, and/or any other device or component that manipulate signals based on operational instructions. Further, the modules 116 can be implemented by one or more hardware components, by computer-readable instructions executed by a processing unit, or by a combination thereof.

In one implementation, the modules 116 further include a classification module 120 and a report generation engine 122. In an example, the modules 116 may also comprises other modules. The other modules may perform various miscellaneous functionalities of the system 102. It will be appreciated that such aforementioned modules may be represented as a single module or a combination of different modules.

In one example, the data 118 serves, amongst other things, as a repository for storing data fetched, processed, received and generated by one or more of the modules 116. In one implementation, the data 118 may include input data 124. In one embodiment, the data 118 may be stored in the memory 112 in the form of various data structures. Additionally, the aforementioned data can be organized using data models, such as relational or hierarchical data models. In an example, the data 118 may also comprises other data used to store data, including temporary data and temporary files, generated by the modules 116 for performing the various functions of the system 102.

In operations, in order to classify the defects/irregularities that are occurring in the software environment, the classification module 120 may receive defect data, comprising various defects that occurred in the software environment, from at least one data source. In an example, the classification module 120 may receive user input along with the defect data. The user input may indicate relevancy, severity, and impact of the defects. Further, the classification may aggregate the defect data and user input to obtain input data 124, which may be further considered for detecting root causes behind the defects. In an example, the classification module 120 may store the user input received in the input data 124 present in the system 102 for easy/quick retrieval.

Further, the classification module 120 may receive current data and historical data pertaining to the software environment from the current environment database 104 and the historical environment database 106, respectively. The current data may include compliance and configurational settings of the software environment in real time. The classification module 120 may analyze the current data to identify a current state of the software environment.

Further, the historical data may comprise records of previous compliance and configurational settings of the software environment. The classification module 120 may use the historical data to determine previous states of the software environment, when the software environment was free from any defects/irregularities.

Thereafter, the classification module 120 may analyze the defect data based on the current data and the historical data to identify at least one root cause behind the defects/irregularities occurring in the software environment. Further, the classification module 120 may apply one or more rules to the defect data to determine the root cause. The one or more rules are discussed in more details in conjunction with FIG. 2.

In an example, the classification module 120 may determine the root cause based on the historical state and the current state of the software environment. The classification module 120 may obtain the defect data and compare the defect data with the current state and the historical data for one or more parameters/fields to obtain the at least one root cause. Examples of the one or more parameters/fields may include license, hardware, remote access, configuration set up, browser, natural calamities, and server traffic.

Further, once the at least one root cause is identified, the classification module 120 may classify each of the defects based on the at least one root cause. Examples of the one or more categories may include a license category, a hardware category, a remote access category, a configuration set up category, a browser category, a natural calamities category, and a server traffic category. In an example, if the classification module 120 identifies that the root cause behind the defects is related to server traffic, the classification module 120 may classify that root cause into the server traffic category.

Subsequently, the report generation engine 122 may generate a classification a classification report for a user to indicate the classification of the defects. The classification report may include classified defects, the at least one root cause, and a severity level associated with each of the defects. In an example, the report generation engine 122 may first provide a root cause report to the user to indicate the at least one root cause. Then, the report generation engine 122 may receive an input from the user on the root cause report. The input may indicate severity of the at least one root cause. The input may be stored by the report generation engine 122 in the input data 124 and may be used while generating the classification report. In an example, the report generation engine 122 may consider various severity factors, such as impact to revenue, nature of issue and customers affected globally, cost/time spent in fixing the problem to resolve, and backup plans In case of shutdown, to determine a severity level to be associated with the at least one root cause in the classification report.

Figure 2:
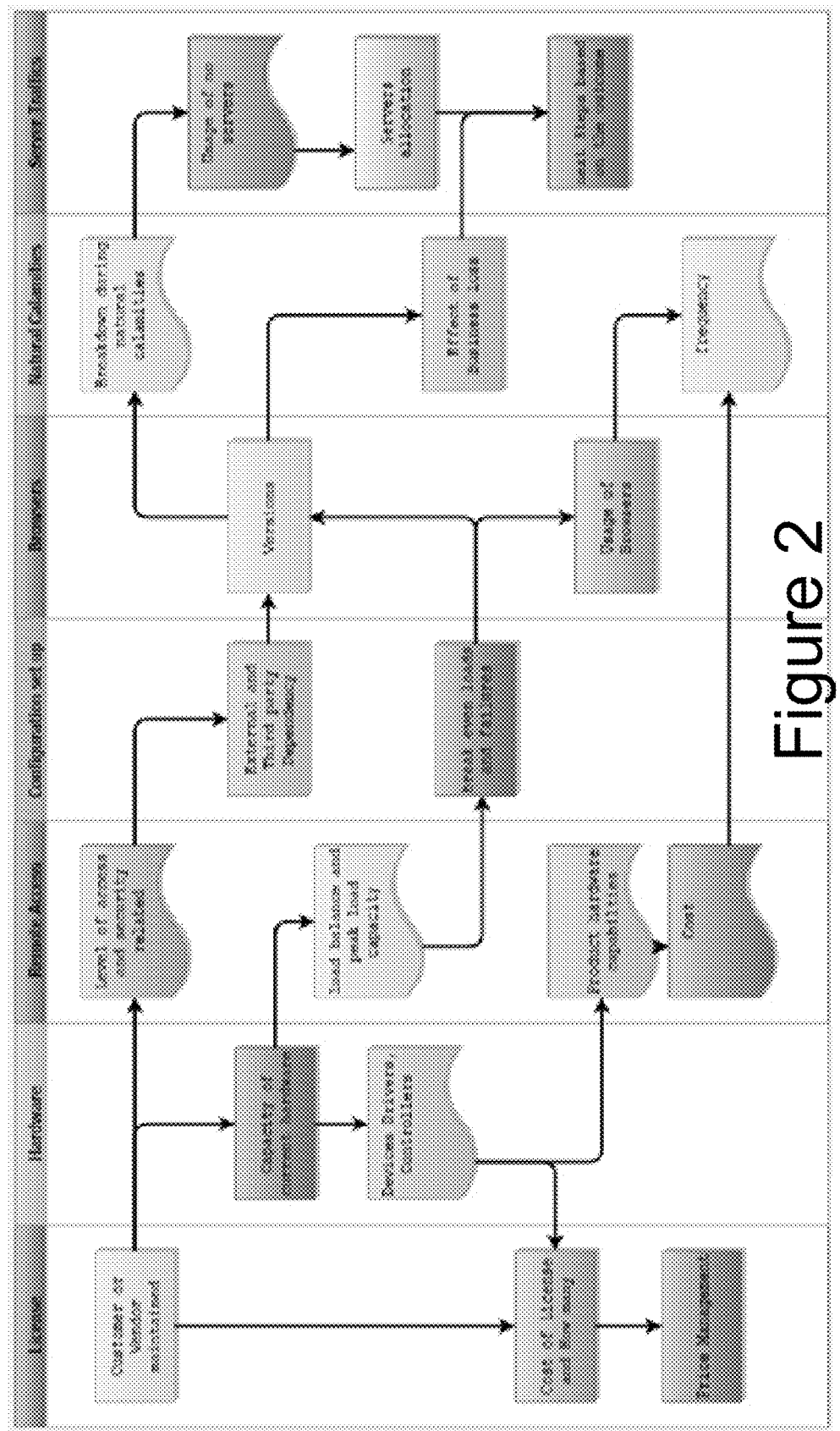
FIG. 2 illustrates exemplary rules to classify defects occurring in a software environment, in accordance with some embodiments of the present disclosure.

FIG. 2 illustrates exemplary rules to classify defects occurring in a software environment, in accordance with some embodiments of the present disclosure.

As shown in FIG. 2, the one or more rules are defined across various parameters/fields, such as license, hardware, remote access, configuration set up, browsers, natural calamities, and server traffic. The one or more rules are used by the classification module 120 to identify the root cause and then classify the defects based on the root cause. The classification module 120 checks the criteria as shown in FIG. 2 to validate, step by step, settings/attributes of the software environment across following fields: license, hardware, remote access, configuration set up, browser, natural calamities, and server traffic. The setting/attributes are obtained from the defect data and the input data 124. As shown in FIG. 2, the defect data is validated across 2 or more criteria in each area, which is then utilized to classify the defects.

For example if the application's license is not maintained from the vendor, the classification module 120 may classify the defect as license maintenance issues, which may be then sub classified to the cost of the license and the tenure of it. Similarly if the license is maintained, then the classification module 120 may proceed to the next area i.e., hardware and check for the following criteria, such as capacity of the current hardware that may show insufficient memory to store the application's output or similar issues, hence classifying the defect to be hardware issue, and relating the defects to the business impacts.

Figure 3:
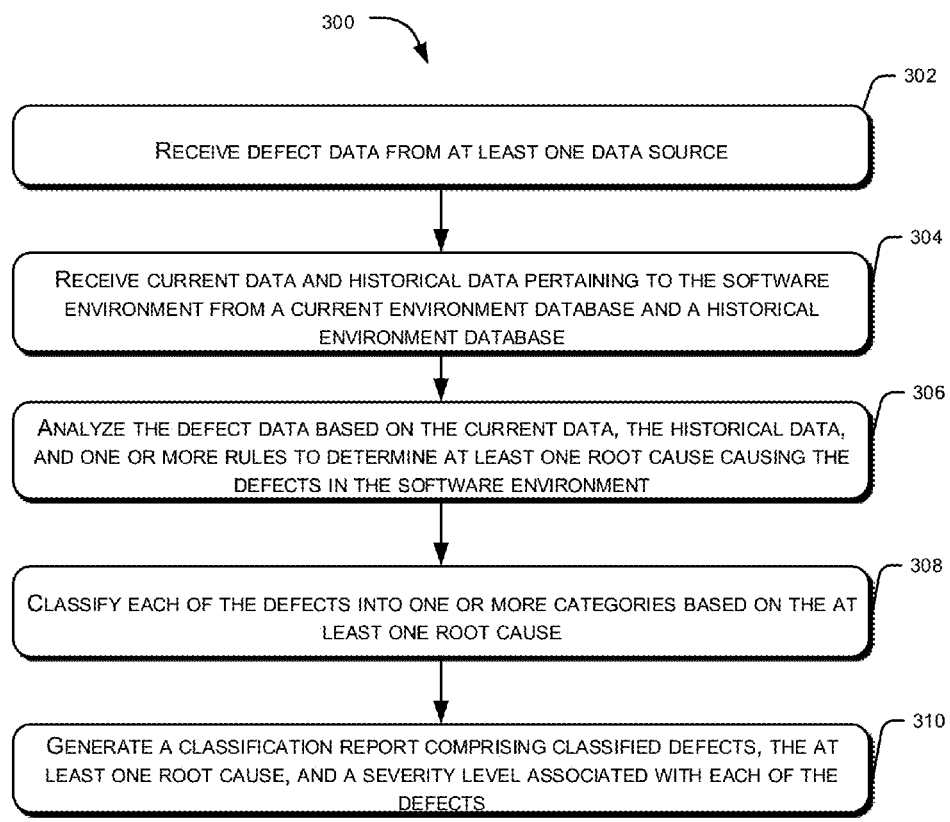
FIG. 3 illustrates an exemplary method for classifying defects occurring in the software environment, in accordance with some embodiments of the present disclosure.

FIG. 3 illustrates an exemplary method for classifying defects occurring in the software environment, in accordance with some embodiments of the present disclosure.

The method 300 may be described in the general context of computer executable instructions. Generally, computer executable instructions can include routines, programs, objects, components, data structures, procedures, modules, and functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 are described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

With reference to FIG. 3, at block 302, defect data from at least one data source is received. The defect data may comprise the defects occurring in the software environment. In an example, the defect data may be received by the classification module 120 from the defect database 108. Further, the classification module 120 may also receive user input, from the user, indicating relevancy, severity, and impact of the defects. The user input and the defect data may be aggregated by the classification module 120 and used as raw/input data for identifying the root cause and classifying the defects.

At block 304, current data and historical data pertaining to the software environment are received from the current environment database 104 and the historical environment database 106, respectively. The current data may comprise compliance and configurational settings of the software environment in real time. The current data is used by the classification module 120 to determine a current state of the software environment.

The historical data may comprise records/logs of previous compliance and configurational settings of the software environment, when the software environment was free from the defects/irregularities. In an example, the classification module 120 may use the historical data to determine historical/previous states of the software environment.

At block 306, the defect data are analyzed based on the current data, the historical data, and one or more rules to determine at least one root cause causing the defects in the software environment. In an example, the classification module 120 may apply the one or more rules, described in FIG. 2, to the defect data and may then analyze the defect data based on the historical data and the current data to determine the at least one root cause.

In an example, the classification module 120 may identify the current state and the historical state for each of one or more parameters to make the comparison with the defect data and identify the root cause. Examples of the one or more parameters may include license, hardware, remote access, configuration set up, a browser, a natural calamities, and server traffic category.

At block 308, each of the defects is classified into one or more categories based on the at least one root cause. Examples of the one or more categories may include a license category, a hardware category, a remote access category, a configuration set up category, a browser category, a natural calamities category, and s server traffic category. In an example, the classification module 120 may classify the defects into the one or more categories based on the root cause. The classification module 120 may identify a field/parameter to which the root cause relates to and may then classify the defects based on the root cause mapping to the fields. For example, in case version of a browser is wrong for the software environment, the classification module 120 may identify browser as root cause for the defect and classify the defect into the browser category.

At block 310, a classification report is generated for the user. The classification report may comprise classified defects, the at least one root cause, and a severity level associated with each of the defects. In an example, the report generation engine 122 may, first, provide a root cause report to the user to indicate the at least one root cause for the defects in the software environment. Thereafter, the user may provide an input indicating severity of the at least one root cause present in the root cause report. The report generation may receive the input from the user and generate the classification report comprising the defects associated with the severity level.

Thus, the present subject matter discloses a method and system 102 to logically classify the defects that occur in the software environment in real time. The present subject matter identifies the root cause behind the defects by comparing various states of the software environment based on the one or more rules and classifies the defects based on the root cause identified. The logical classification of the defects allows efficient resolution of stagnant defects which is impacting performance of applications present in the software environment.

Computer System (Also Referred to as Computer Apparatus)

Figure 4:
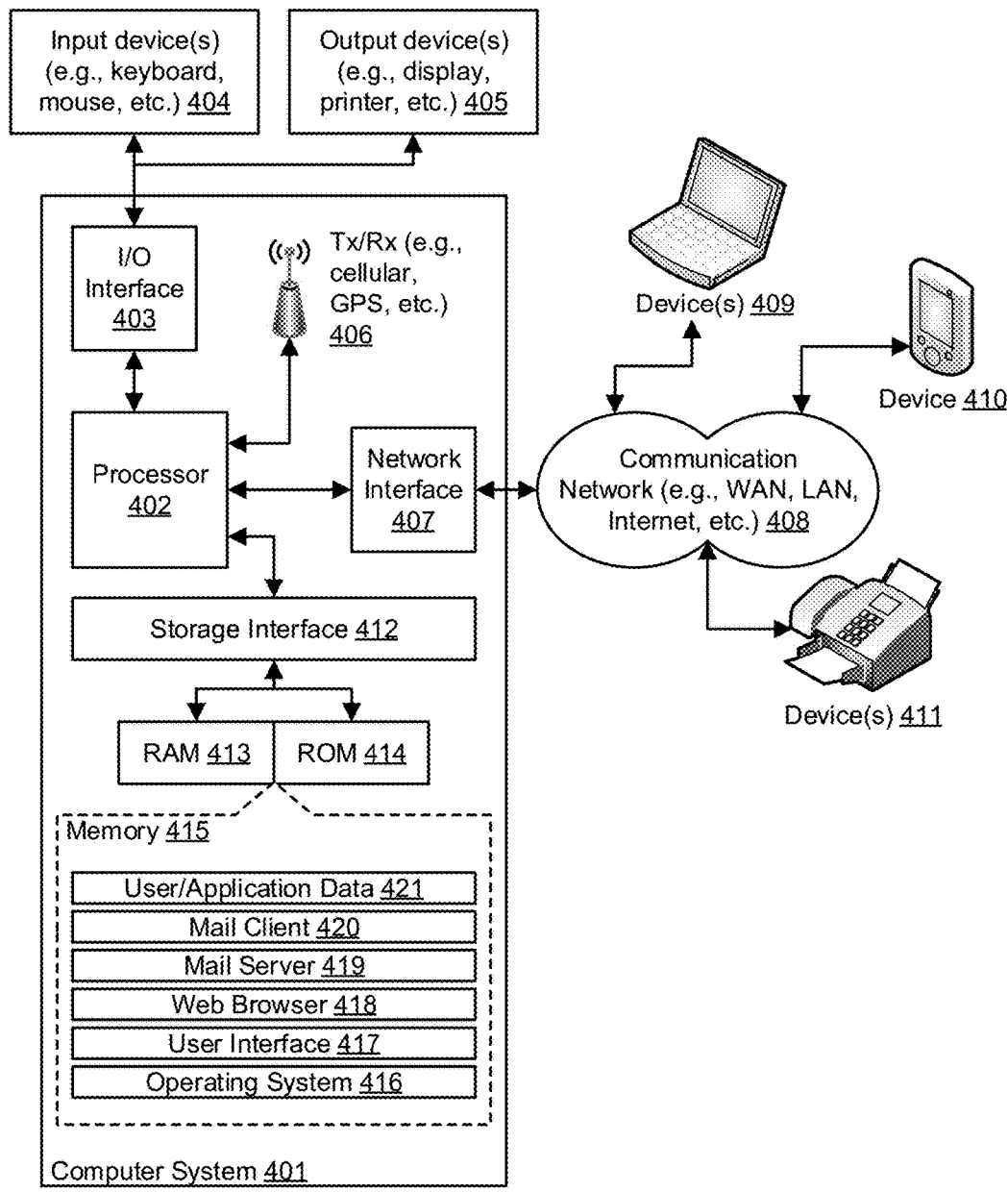
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing a defect classification computing apparatus with the classification module 120 and the report generation engine 122 presented in this disclosure by way of example only. Computer system 401 may comprise a central processing unit ("CPU" or "processor"). Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for classifying defects occurring in a software environment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for classifying defects occurring in a software environment, the method comprising:
   receiving, by a defect classification computing apparatus, defect data from at least one data source, wherein the defect data comprises the defects occurring in the software environment;
   receiving, by the defect classification computing apparatus, current data and historical data pertaining to the software environment from a current environment database and a historical environment database, wherein the historical data is indicative of a defect free state of the software environment;
   analyzing, by the defect classification computing apparatus, the defect data based on the current data and the historical data, and analyzing the defect data based on one or more rules to identify a current state and a historical state for each of one or more parameters;
   comparing, by the defect classification computing apparatus, the current state and the historical state of the software environment for each of the one or more parameters;
   validating, by the defect classification computing apparatus, the defect data across two or more criteria in a pre-defined sequence, based on the comparison,
      wherein each of the two or more criteria are associated with a parameter from the one or more parameters,
      wherein each of the two or more criteria are indicative of a root cause causing the defects occurring in the software environment and an associated business impact, and
      wherein the one or more parameters comprise license, hardware, remote access, configuration set up, browser, natural calamities, or server traffic; and
   classifying, by the defect classification computing apparatus, each of the defects into one or more categories based on the at least one root cause.

2. The method of claim 1, further comprising generating, by the defect classification computing apparatus, a classification report comprising classified defects, the at least one root cause, and a severity level associated with each of the defects.

3. The method of claim 2, wherein the generating the classification report further comprises:
   providing, by the defect classification computing apparatus, a root cause report indicating the at least one root cause for the defects in the software environment; and
   receiving, by the defect classification computing apparatus, an input on the root cause report, wherein the input indicates severity of the at least one root cause.

4. The method of claim 1, wherein the receiving the defect data further comprises receiving, by the defect classification computing apparatus, a user input comprising relevancy, severity, and impact of the defects.

5. The method of claim 1, wherein the current data comprises compliance and configurational settings of the software environment in real time and wherein the historical data comprises records of previous compliance and configurational settings of the software environment.

6. The method of claim 1, wherein the one or more categories comprises a license category, a hardware category, a remote access category, a configuration set up category, a browser category, a natural calamities category, or a server traffic category.

7. A defect classification system for defects occurring in a software environment, the system comprising:
   one or more processors;
   a memory coupled to the one or more processors which are configured to be capable of executing programmed instructions, which comprise the programmed instructions stored in the memory to:
      receive defect data from at least one data source, wherein the defect data comprises the defects occurring in the software environment;
      receive current data and historical data pertaining to the software environment from a current environment database and a historical environment database, wherein the historical data is indicative of a defect free state of the software environment;
      analyze the defect data based on the current data and the historical data, and analyze the defect data based on one or more rules to identify a current state and a historical state for each of one or more parameters;
      compare the current state and the historical state of the software environment for each of the one or more parameters;
      validate the defect data across two or more criteria in a pre-defined sequence,
         wherein each of the two or more criteria are associated with a parameter from the one or more parameters,
         wherein each of the two or more criteria are indicative of a root cause causing the defects occurring in the software environment and an associated business impact, and
         wherein the one or more parameters comprise license, hardware, remote access, configuration set up, browser, natural calamities, or server traffic; and
      classify each of the defects into one or more categories based on the at least one root cause.

8. The system of claim 7, wherein the one or more processors are further configured to be capable of executing the programmed instructions stored in the memory to:
   generate a classification report comprising classified defects, the at least one root cause, and a severity level associated with each of the defects.

9. The system of claim 8, wherein for the generate the classification report the one or more processors are further configured to be capable of executing the programmed instructions stored in the memory to:
   provide a root cause report indicating the at least one root cause for the defects in the software environment; and
   receive an input on the root cause report, wherein the input indicates severity of the at least one root cause.

10. The system of claim 7, wherein for the receive the defect data the one or more processors are further configured to be capable of executing the programmed instructions stored in the memory to:
receive user input comprising relevancy, severity, and impact of the defects.

11. The system of claim 7, wherein the current data comprises compliance and configurational settings of the software environment in real time and wherein the historical data comprise records of previous compliance and configurational settings of the software environment.

12. The system of claim 7, wherein the one or more categories comprises a license category, a hardware category, a remote access category, a configuration set up category, a browser category, a natural calamities category, or a server traffic category.

13. A non-transitory computer readable medium having stored thereon instructions for classifying defects occurring in a software environment comprising executable code which when executed by one or more processors, causes the processors to perform steps comprising:
receiving defect data from at least one data source, wherein the defect data comprises defects occurring in a software environment;
receiving current data and historical data pertaining to the software environment from a current environment database and a historical environment database, wherein the historical data is indicative of a defect free state of the software environment;
analyzing the defect data based on the current data, the historical data, and one or more rules to determine at least one root cause causing the defects in the software environment; and
analyzing the defect data based on the current data and the historical data, and analyzing the defect data based on one or more rules to identify a current state and a historical state for each of one or more parameters;
comparing the current state and the historical state of the software environment for each of the one or more parameters;
validating the defect data across two or more criteria in a pre-defined sequence,
wherein each of the two or more criteria are associated with a parameter from the one or more parameters,
wherein each of the two or more criteria are indicative of a root cause causing the defects occurring in the software environment and an associated business impact, and
wherein the one or more parameters comprise license, hardware, remote access, configuration set up, browser, natural calamities, or server traffic; and
classifying each of the defects into one or more categories based on the at least one root cause.

14. The medium of claim 13, further comprising generating a classification report comprising classified defects, the at least one root cause, and a severity level associated with each of the defects.

15. The medium of claim 14, wherein the generating the classification report further comprises:
providing a root cause report indicating the at least one root cause for the defects in the software environment; and
receiving an input on the root cause report, wherein the input indicates severity of the at least one root cause.

16. The medium of claim 13, wherein the receiving the defect data further comprises receiving user input comprising relevancy, severity, and impact of the defects.

17. The medium of claim 13, wherein the current data comprise compliance and configurational settings of the software environment in real time and wherein the historical data comprise records of previous compliance and configurational settings of the software environment.

18. The medium of claim 13, wherein the one or more categories comprises a license category, a hardware category, a remote access category, a configuration set up category, a browser category, a natural calamities category, or a server traffic category.

* * * * *